Figure 1:
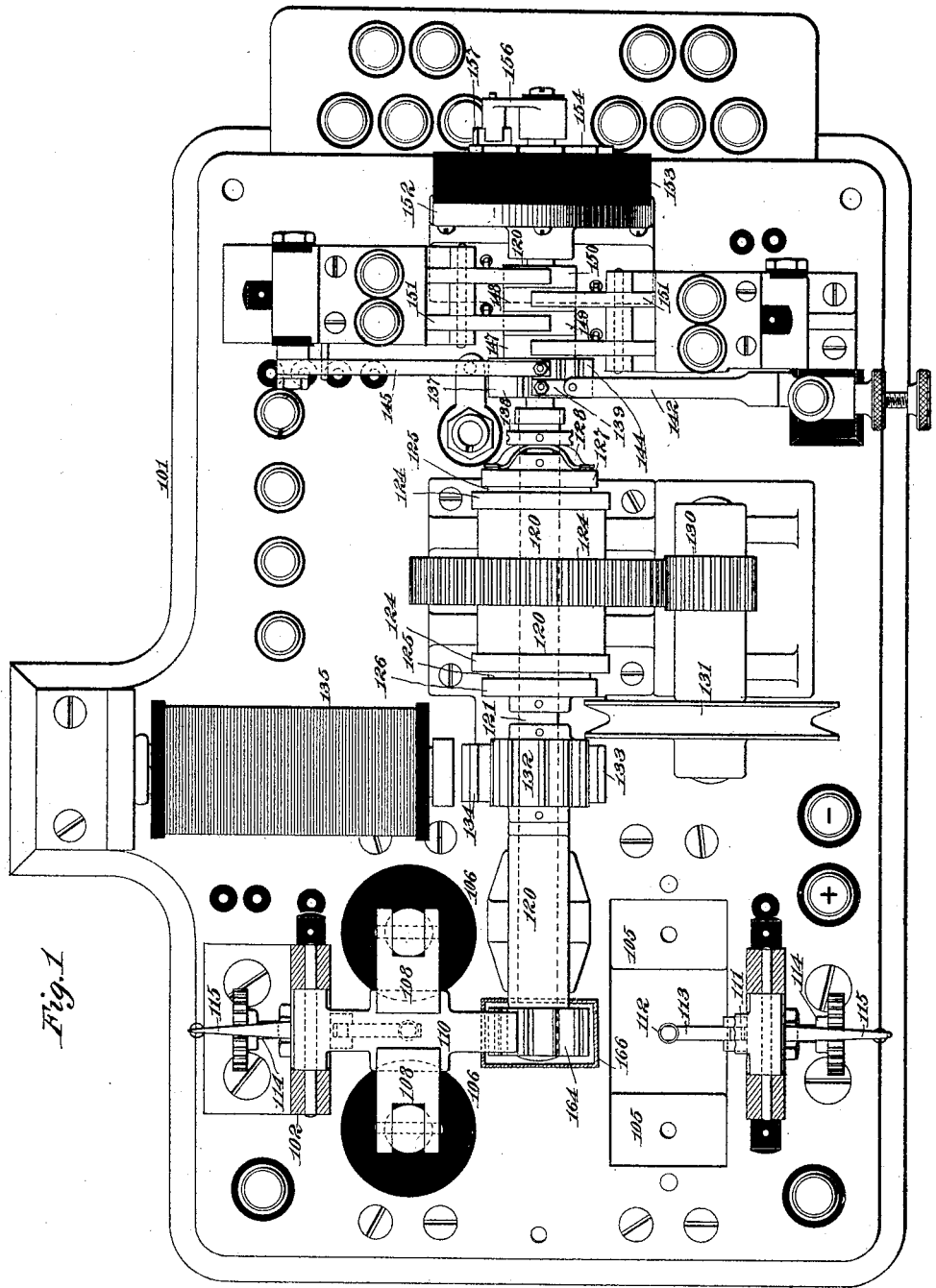

No. 637,789. Patented Nov. 28, 1899.
K. HIMROD, J. R. TUCKER & C. C. HINCKLEY.
COMBINED RELAY AND DISTRIBUTER.
(Application filed Mar. 10, 1899.)

(No Model.) 6 Sheets—Sheet 1.

Witnesses:
Inventors

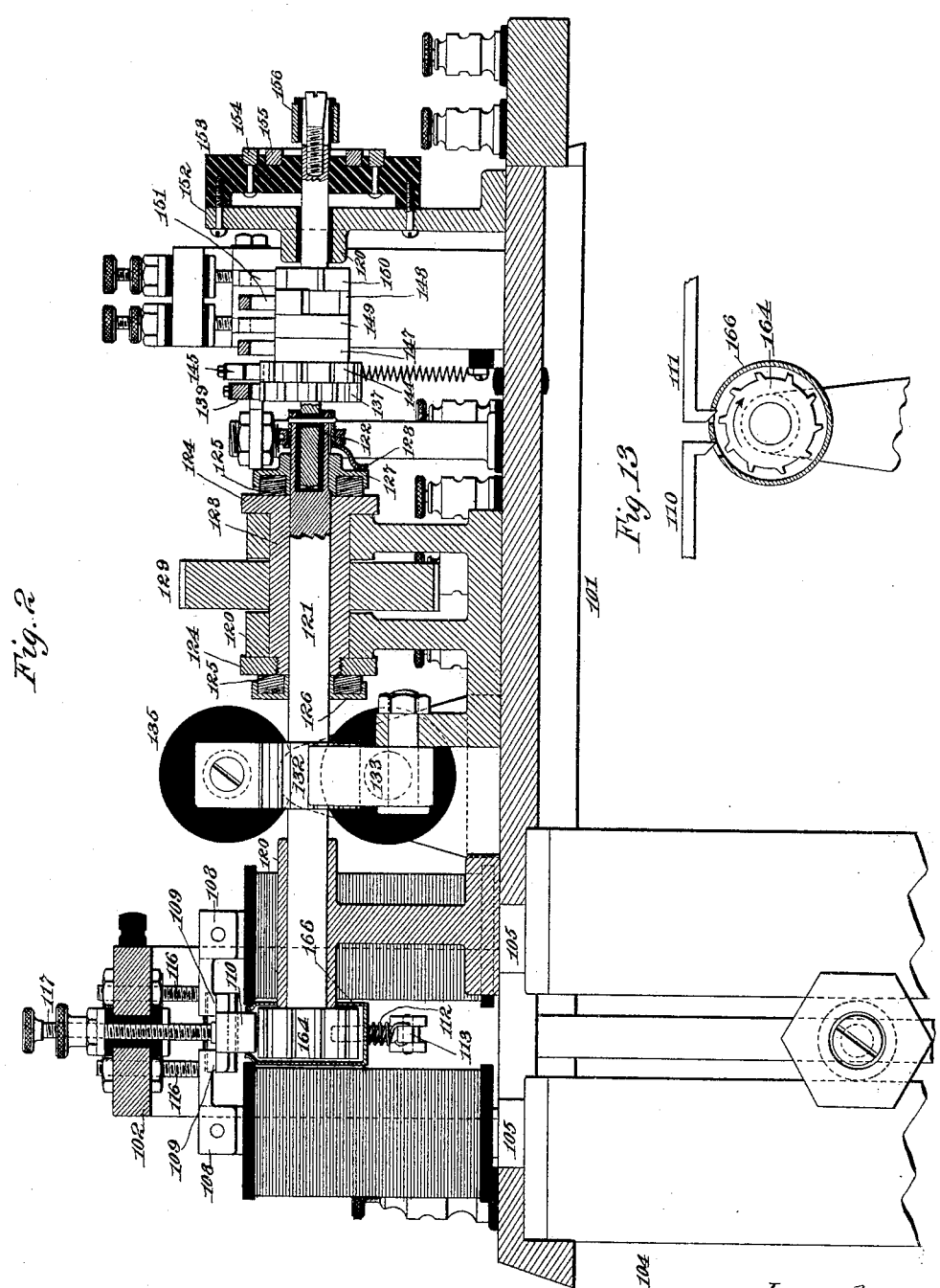

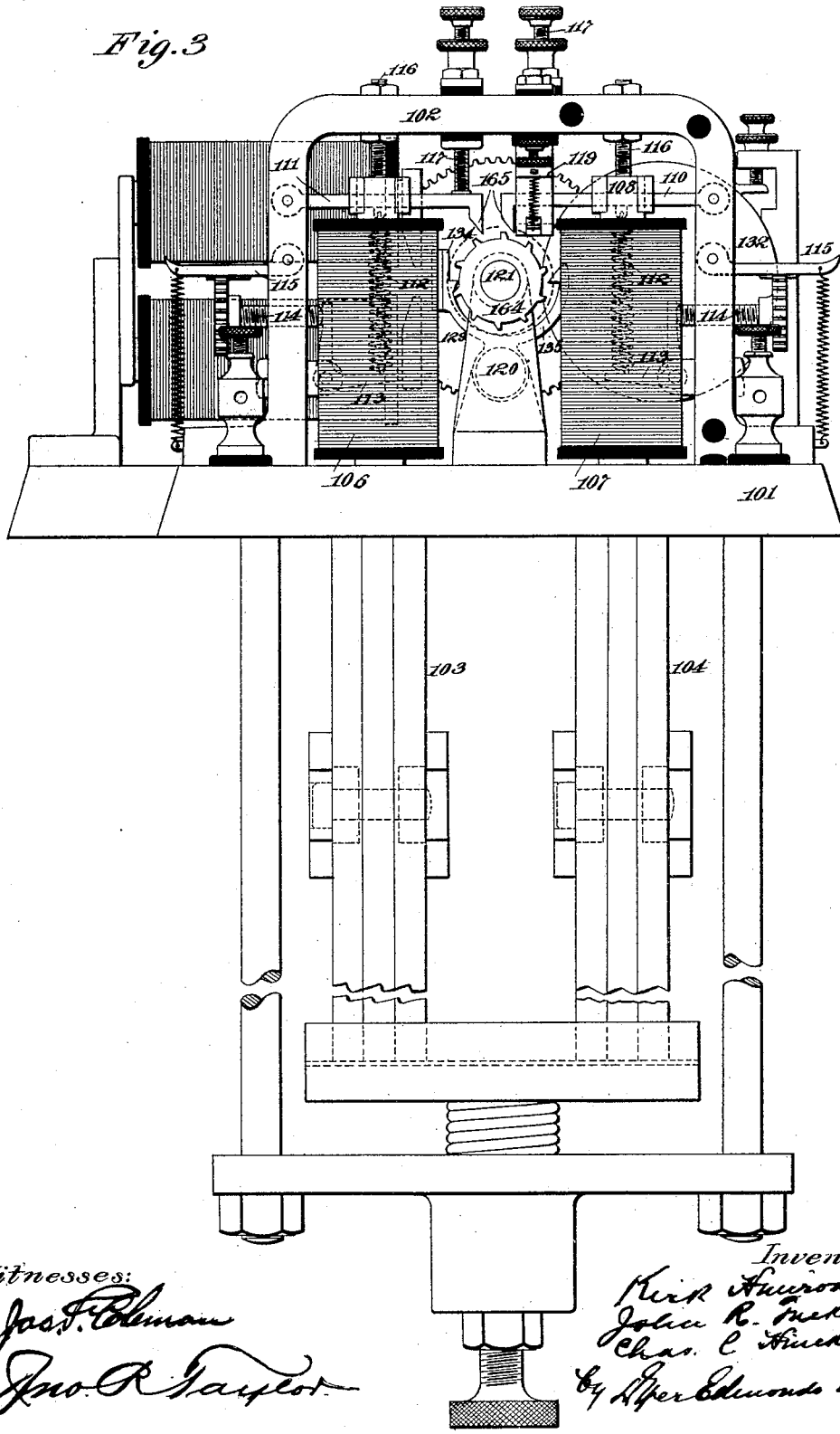

No. 637,789. Patented Nov. 28, 1899.
K. HIMROD, J. R. TUCKER & C. C. HINCKLEY.
COMBINED RELAY AND DISTRIBUTER.
(Application filed Mar. 10, 1899.)
(No Model.) 6 Sheets—Sheet 4.
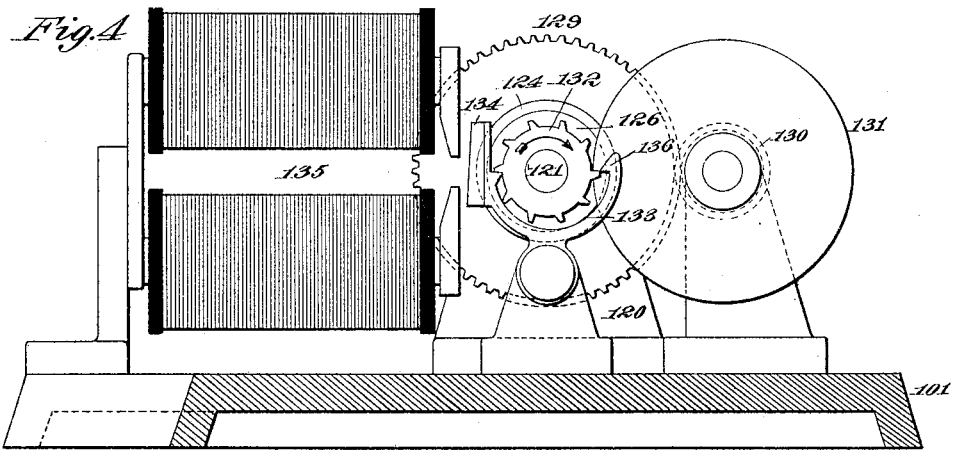
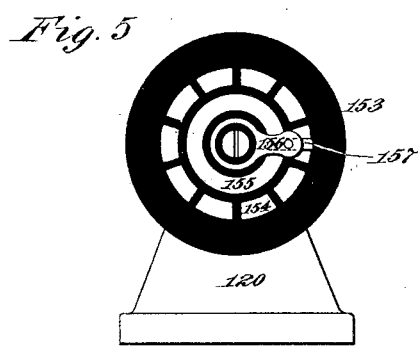
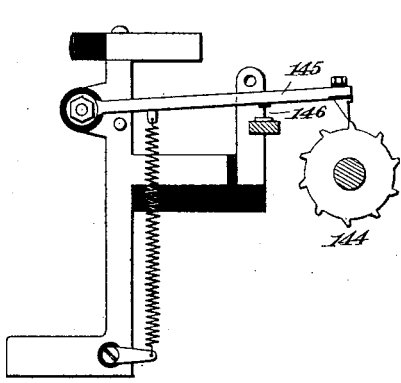
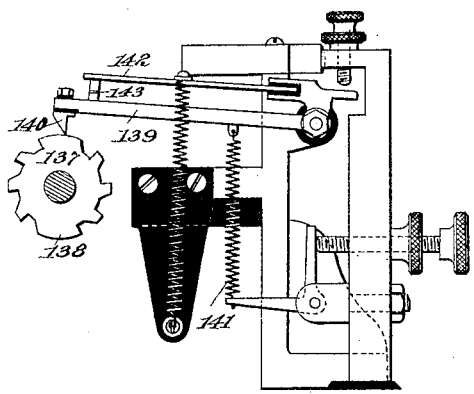
Witnesses:
Jas. F. Coleman
Jno. R. Taylor
Inventors
Keribb Himrod
John R. Tucker
Chas. C. Hinckley
by Dyer, Edmunds & Dyer
Att'ys.
THE NORRIS PETERS CO., PHOTO-LITHO., WASHINGTON, D. C.

No. 637,789. Patented Nov. 28, 1899.
K. HIMROD, J. R. TUCKER & C. C. HINCKLEY.
COMBINED RELAY AND DISTRIBUTER.
(Application filed Mar. 10, 1899.)
(No Model.) 6 Sheets—Sheet 6.

UNITED STATES PATENT OFFICE.

KIRK HIMROD, OF CHICAGO, AND JOHN R. TUCKER AND CHARLES C. HINCKLEY, OF AURORA, ILLINOIS, ASSIGNORS TO THE INTERNATIONAL TYPAL TELEGRAPH COMPANY, OF DETROIT, MICHIGAN.

COMBINED RELAY AND DISTRIBUTER.

SPECIFICATION forming part of Letters Patent No. 637,789, dated November 28, 1899.

Application filed March 10, 1899. Serial No. 708,600. (No model.)

*To all whom it may concern:*

Be it known that we, KIRK HIMROD, of Chicago, in the county of Cook, and JOHN R. TUCKER and CHARLES C. HINCKLEY, of Aurora, in the county of Kane, State of Illinois, citizens of the United States, have invented a certain new and useful Improvement in a Combined Relay and Distributer, of which the following is a specification.

Our invention relates to an improved combined relay and distributer.

We have especially designed the relay and distributer for use in a printing-telegraph apparatus of an improved Baudot type invented by Kirk Himrod and described and claimed in his application for a patent filed March 25, 1898, Serial No. 675,121, patented May 9, 1899, No. 624,487. In the system used in the printing-telegraph of Baudot there are transmitted for each character over a single wire a series of electrical impulses of substantially equal duration, (five or more,) some of one polarity and some of the other polarity, each character being distinguished from all other characters by a particular permutation of the impulses, and wherein these impulses act upon a selecting mechanism at the receiving end of the line and so adjust it as to cause the operation of the printing mechanism to print a particular character. Our improved relay-distributer, when employed in connection with a printing-telegraph apparatus of the Baudot type, is located at the receiving end between the line and the selector, and its purpose is to adjust the selector in accordance with the particular permutation of impulses, so that a printing-magnet will be controlled to print the required letter or character. When so used, the improved relay or distributer will be arranged to be positively acted upon by impulses only of one polarity and to be negatively acted upon by impulses of the opposite polarity. When the relay-distributer is positively acted upon, the selector-magnet with which the distributer may at the time of the impulse be connected will be energized; but when the distributer is negatively acted upon the corresponding selector-magnet will not be energized, and the succeeding selector-magnet will be subsequently connected to the distributer, to be acted upon or passed over, according as the next line impulse may positively or negatively act upon the distributer.

A feature of the Baudot apparatus as improved by Kirk Himrod with which our present invention possesses an especial adaptation, is the use of two separate selectors adapted to be operated in succession, the distributer first distributing local impulses to one or more of the selector-magnets of one selector and then distributing local impulses to one or more of the selector-magnets of the other selector and also closing a printing-circuit through the selector already set, while local impulses are being distributed to the other selector, and after the closing of the printing-circuit also effecting the restoration of the first selector, ready for the reception thereby of local impulses representing a new character or letter. By thus setting one selector while printing is being effected by a selector previously set and by then restoring such previously-set selector the line may be occupied at all times instead of withholding the sending of line impulses during the printing and restoration of a selector, as would be necessary if only a single selector were used. Our improved relay-distributer is especially adapted for this use and is arranged to distribute local currents successively to two selectors, and while distributing such currents to one of the selectors to first close the printing-circuit to the other selector and to then restore such other selector.

It will be understood that our invention may be applied to the setting of only a single selector or to the successive setting and restoration of two selectors arranged for other purposes than for the control of a printing-telegraph receiver. When five selector-magnets are used, it is possible to obtain thirty-two separate and distinct permutations or combinations thereof, and hence the selector is adapted for the control or operation of thirty-two separate devices—such, for example, as the printing-magnets or the printing-controlling magnets of a printing-telegraph receiver, the various elements of a torpedo, the parts of a typesetting-machine, or, in fact, any other device or apparatus which it may be of advantage to control from a distance.

The essential object of our invention is to simplify the construction and improve the efficiency of a relay-distributer. To effect this object, we provide a single distributer-shaft intermittently controlled by an escape-magnet and carrying the several circuit making and breaking devices, (except those directly controlled by the relay-armatures,) and also the distributer-arm coöperating with the distributer-plates which are connected to the selector-magnets.

Another object of the invention is to increase the efficiency of the relay. To this end we employ a modified Hughes relay comprising two permanent magnets arranged side by side, the poles thereof carrying the coils and so wound that one set of poles will be neutralized by impulses of one polarity and the other set by impulses of the opposite polarity. The poles are provided with downturned faces, with each pair of which coöperates an armature normally maintained in an elevated position, but tending to be forced downward by a spring. The operation of these armatures controls the escape-magnet, and one of them controls a local circuit to the distributer-plates and selector-magnets. The distributer-shaft is located immediately beneath the two armatures and carries resetting-cams thereon, adapted to positively reset the relay-armatures during each feed movement of the distributer-shaft, and preferably near the latter part of such feed movement. By thus positively resetting the relay-armatures we are enabled to very materially increase the speed of operation thereof. By providing the relay-magnets with inverted polar faces, so as to maintain the armatures normally elevated, and by locating the distributer-shaft below the armatures, we are enabled to immerse the cams for positively resetting the armatures in an oil trough or shield, whereby wear will be largely avoided.

Another object of our invention is to improve the efficiency of the escapement mechanism for the distributer-shaft. To this end we provide an escapement-pallet for the distributer-shaft arranged to lock the shaft from movement when the armature carried by the pallet is in contact, or substantially so, with the poles of the escapement-magnet, the latter being arranged in a normally-closed local circuit adapted to be broken by the release of either of the relay-armatures. The breaking of the escapement-circuit releases the escapement-pallet, allowing the distributer-shaft to turn one step and returning the pallet-armature again into its normal position to be attracted by the escapement-magnet to lock the distributer-shaft. In order to further accomplish this object of our invention, we provide a secondary circuit-closer in a branch including the escapement-magnet, which secondary circuit-closer is adapted to be operated to close the branch circuit the instant the escapement-pallet is sufficiently removed from the escapement-magnet as to be withdrawn from the influence of the latter. This operation of the secondary circuit-closer takes place before one of the relay-armatures could be released by a line-impulse and again reset to close the primary local circuit through the escapement-magnet. By thus operating a secondary circuit-closer an instant after the deënergization of the escapement-magnet and immediately succeeding the release of one of the relay-armatures we give the escapement-magnet ample time to become built up ready to again attract and hold the pallet-armature. This feature is of importance when high speed of operation is desired.

Another object of the invention is the positive operation of the distributer-shaft by power connections, which object is effected by interposing between the distributer-shaft and the source of power a slipping clutch, whereby the shaft will at all times be under stress and will start the instant of its release by the escapement-magnet.

In an apparatus employing a relay-distributer, and particularly in a printing-telegraph system, abnormal circuit conditions are to be expected and must be accounted for. For instance, in a printing-telegraph of the Baudot type mutilated signals are sometimes received composed of a less number of impulses than are necessary to effect a normal operation, and sometimes only a single impulse will be sent over the line from an accidental cause. The relay-distributer should therefore be capable of accommodating these abnormal or mutilated signals without becoming placed in a condition of aberration, and it is another object of our invention to provide with our improved relay-distributer a device by means of which this result is effected. To this end we employ a "corrector" adapted under abnormal conditions to successively close and break the primary local circuit to the escapement-magnet, which corrector is made of sufficient mass as to coöperate with a toothed cam on the distributer-shaft in such a way that when the latter is intermittently moving at its proper speed the corrector does not affect the primary local escapement-circuit; but when a lower speed is given the distributer-shaft, or the latter tends to stop at an intermediate point, the corrector will break the said local circuit, deënergizing the escapement-magnet and allowing successive feed movements to take place until the distributer-shaft reaches its desired normal position, at which time the corrector will be locked so as to be incapable of affecting the escapement-magnet.

In order that our invention may be better understood, attention is directed to the accompanying drawings, forming part of this specification, and in which—

Figure 8:
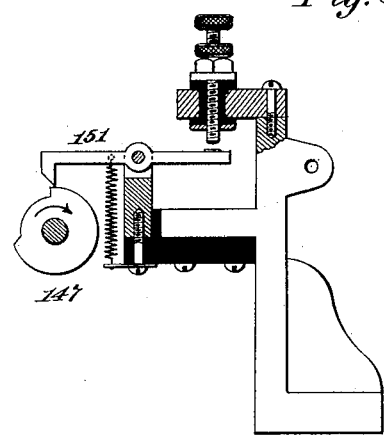
Figure 9:
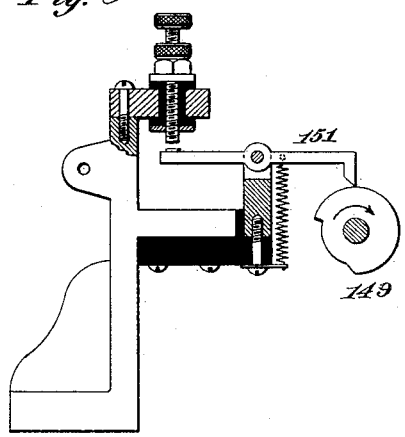
Figure 10:
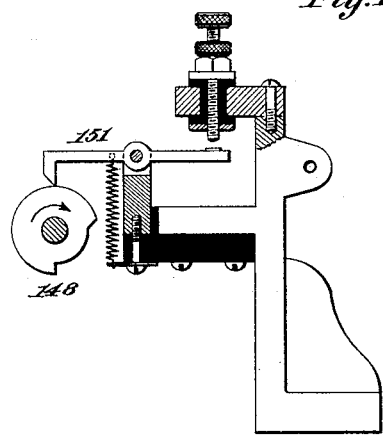
Figure 11:
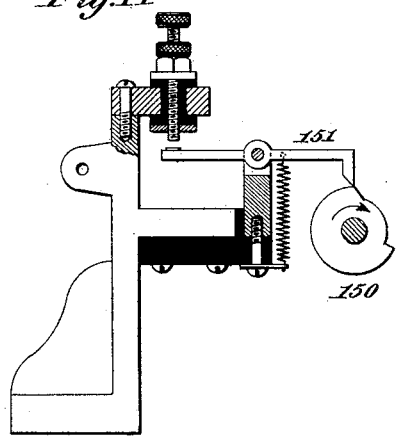
Figure 12:
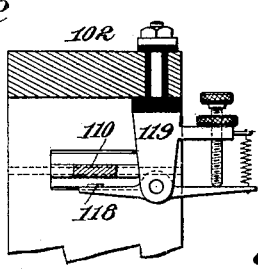
Figure 14:
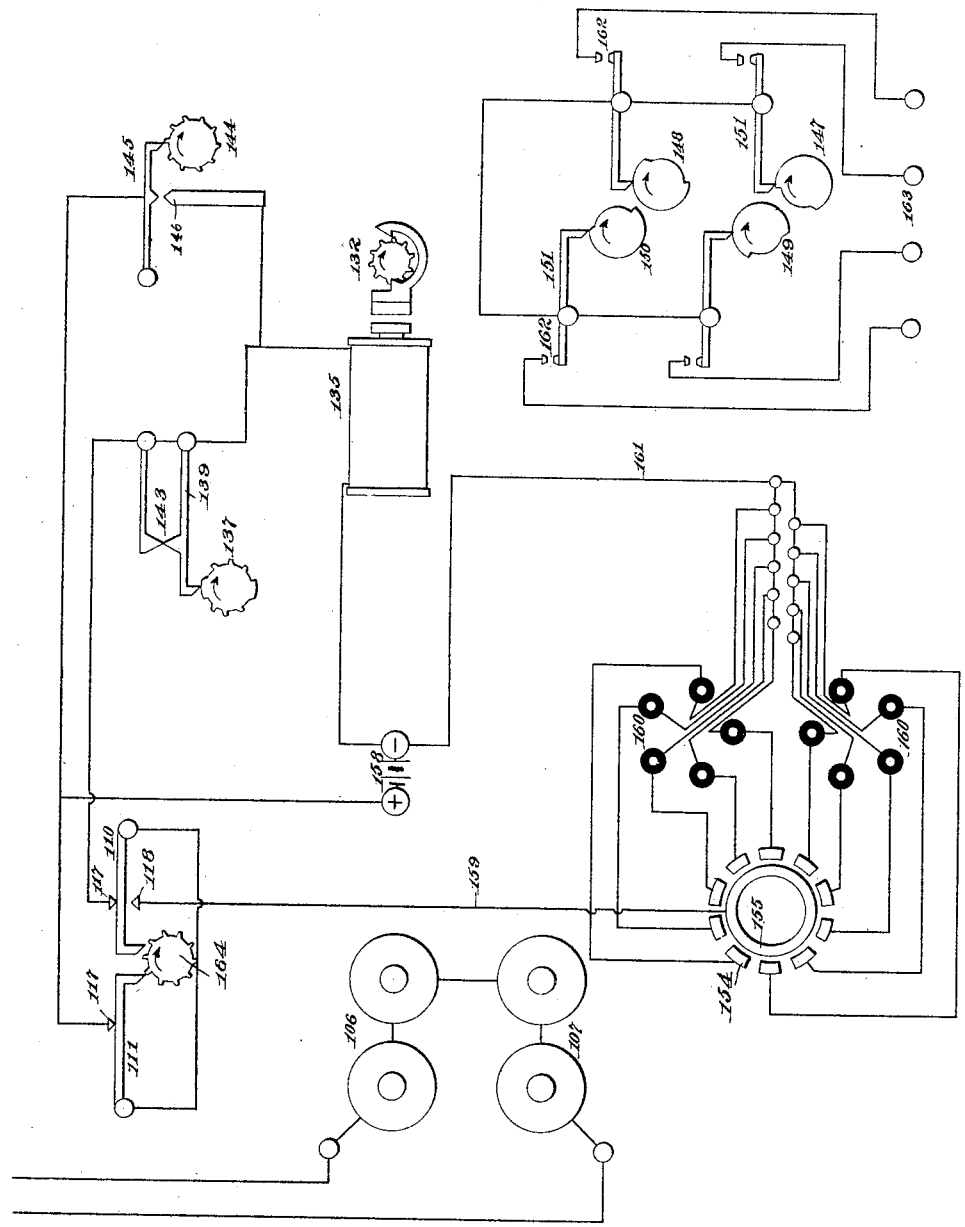

Figure 1 is a plan with parts broken away to illustrate the relay-armatures and the parts normally concealed by the upper section of the supporting-yoke; Fig. 2, a longitudinal sectional view; Fig. 3, a front view from the relay end; Fig. 4, a cross-section illustrating the escapement-magnet and its coöperating parts; Fig. 5, an end view of the distributer-plates; Fig. 6, a cross-section taken at the line of the corrector; Fig. 7, a cross-section taken at the line of the secondary circuit-closer; Fig. 8, a cross-section taken at the line of the first printing-cam; Fig. 9, a similar view taken at the line of the first return-cam; Fig. 10, a cross-section taken at the line of the second printing-cam; Fig. 11, a similar view through the second return-cam; Fig. 12, a section illustrating the circuit-closer for the circuit through the distributer-plates; Fig. 13, a section through the resetting-cam and oil-trough; Fig. 14, a diagrammatic view illustrating the circuits and showing the distributer for use with two separate sets of selector-magnets.

In all of the above views corresponding parts are represented by the same numerals of reference.

101 represents a suitable cast base carrying the operating parts.

102 is a yoke secured to the base 101.

103 and 104 are the permament magnets depending from the base 101 and having contact-poles 105 105, which carry the coils 106 106 and 107 107. The poles 108 of these coils are provided with inverted faces 109, with which coöperate the two armatures 110 and 111. These armatures are normally maintained in an elevated position by the attraction of the polar faces 109 109 and are adapted to be drawn downward by springs 112 112 when the magnetism is neutralized by impulses of one or the other polarity on one or the other sets of coils 106 106 and 107 107. The springs 112 connect at their lower ends with bell-cranks 113, adjusted by screws 114, the milled heads of which are locked by the pawls 115. The pole-pieces 108 of the coils are pivoted, as shown, to the cores thereof and are connected to the adjusting-screws 116, whereby the polar faces 109 may be adjusted with respect to the armatures 110 and 111. The armatures 110 and 111 on their attracted position coöperate with contact-screws 117 117, which control the circuit to the escapement-magnet, as will be explained. On the unattracted position of the armature 110 the latter engages a contact-stop 118, (see Fig. 12,) carried by an insulated arm 119 from the yoke 102 and controlling the circuit to the distributer-plates, as will be pointed out when the circuit connections are explained.

Mounted in bearings 120 on the base 101 is a distributer-shaft 121. This shaft is made, preferably, of two sections insulated from each other by an insulating-sleeve 122.

123 is a sleeve surrounding the shaft and having two flanges 124 124, with which coöperate two friction-disks 125, carried in the cups 126 and 127, the former being pinned to the shaft and the latter being splined thereto with a compression-spring 128 behind it. The spring 128 maintains the friction-surfaces 125 in contact with the flanges 124, thereby providing a slipping friction between the sleeve 123 and the shaft 121. The sleeve is driven by a gear 129 from a pinion 130 and belt-wheel 131, driven by any suitable source of power. The distributer-shaft 121 carries an escapement-wheel 132, with which coöperates a pivoted pallet 133. Carried by the pallet 133 is an armature 134, adapted to be brought, preferably, into actual contact with the poles of an escape-magnet 135. The direction of movement of the shaft 121 is indicated by the arrow, Fig. 4, and normally the pallet-tooth 136 will lock the escapement-shaft when the armature 134 is attracted by the escape-magnet. When the said magnet is deënergized, the escapement-teeth will rock the escapement to the position shown in Fig. 4 and then return it to its normal position, when the armature will be again attracted by the escape-magnet.

Carried by the distributer-shaft 121 is a corrector-cam 137, having teeth therein and two broad teeth 138. Two of the broad teeth 138 are used when a distributer is employed for distributing to two separate selectors, in which case the distributer-shaft, as will be explained, will have two normal positions of rest. When, however, the distributer is used for the purpose of distributing to only a single selector, the cam 137 will be provided with only one of the broad teeth 138. 139 is the corrector, comprising a pivoted lever of the desired mass and having a wedge-shaped tooth 140, which bears on the cam 137. The corrector is drawn downward by a light spring 141, but may fall by its weight. Coöperating with this corrector is a spring 142, insulated therefrom, and between the corrector and spring 142 are the contacts 143, controlling a circuit to the escape-magnet. The purpose of this corrector will become clear when the operation of the device is explained. The distributer-shaft also carries a cam 144, having a series of regularly-spaced teeth and with which coöperates a secondary circuit-closer 145, having an insulated wedge-shaped tooth engaging the cam. This circuit-closer is normally drawn downward by a spring and is adapted to close the circuit between two contacts 146 in a branch circuit with the escapement-magnet immediately after the latter is deënergized and its armature has been withdrawn by the escapement-teeth out of its influence. Carried also on the distributer-shaft are the necessary printing and restoring cams. When two selectors are used, as is preferable, the distributer will be so made as to first distribute local impulses to one selector, and during this distribution of impulses to close a printing-circuit to the other selector already set and to then restore such other selector to its normal position, these printing and restoration operations taking place during the setting of the other selector to the next letter or character. When used with two selectors, therefore, the distributer-shaft carries two printing-cams 147 and 148 and two restoration-cams 149 and 150, with which coöperate the levers 151, adapted to close the necessary printing or restoration circuit. The cut-away portions of the cams 147 to 150, it will be noted, are successively advanced with respect to the cycle of rotation.

The end bearing 120 of the shaft 121 carries an integral plate 152, to which the insulating-disk 153 is secured. This disk carries the distributer-plates 154 and the collecting-ring 155 in circuit with the circuit-maker 118. At its end the distributer-shaft carries the distributer-arm 156, carrying the brush 157, bridging the distributer-plates 154 and the ring 155. When the distributer is used in connection with two selectors each of which has five selector-magnets, ten of these distributer-plates will be employed. When a greater or less number of selector-magnets are used, the distributer-plates will be correspondingly varied.

Referring to Fig. 14, the circuits will be understood. The main line leads through the coils 106 106 and 107 107. A local battery 158 is included in a normally-closed circuit through the contacts 117 117, both relay-armatures, the contacts 143 of the corrector, and the escape-magnet. A normally-open branch around the corrector and contacts 117 includes the battery 158, the contacts 146 of the secondary circuit-closer, and the escape-magnet. The said battery is also included in a normally-open circuit through the contact 117 for the relay-armature 111, the armature 110, the contact 118, the connection 159, to the collecting-ring 155, thence to the several distributer-plates, the selector-magnets, 160, and the common return 161, this circuit being normally broken between the armature 110 and the contact 118. The said battery is also connected, through the contacts 162, adapted to be closed by the several circuit-closers 151, to binding-posts 163, to which the printing and restoration circuits of the two selectors are connected, such circuits returning to the battery through the common return-wire 161.

The relay-armatures, when they have been released by the line impulses, may be restored by the attraction of the permanent magnets; but such an operation would be comparatively sluggish and would not be adapted for high speed. We therefore prefer to restore the relay-armatures by positive means, whereby we are enabled to very materially increase the speed and certainty of operation of the device. We therefore provide on the extreme forward end of the distributer-shaft a resetting-cam 164, having a series of wedge-shaped teeth thereon, which coöperate with the downturned wedged ends 165 of the two relay-armatures. The teeth are so disposed as to elevate one or the other of the relay-armatures at the same position of the feed movement of the shaft and are so spaced as to reset the relay-armatures near the end of the feed-stroke, thereby allowing the maximum time for the energization of the several selector-magnets. In order to reduce wear between the resetting-cam and the relay-armatures, we preferably surround the cam with a trough or shield 166, having openings therein through which the wedge-shaped ends of the armatures may pass to engage the cam-teeth. This trough or shield is supplied with oil in any suitable way.

The operation of the device is as follows: Normally the armatures 110 111 are attracted by the permanent magnets closing the circuit at the contacts 117 117 through the escapement-magnet 135. The armature 134 will be thus attracted, and the tooth 136 of the pallet will lock the escapement-shaft from movement. In this position the corrector will be resting upon one of the wide teeth 138 of its cam. Power is applied to the sleeve 123 and tends to drive the shaft. When an impulse of one—say positive—polarity passes over the line, the coils 107 are neutralized, allowing the armature 111 to drop. This breaks the circuit through the escapement-magnet and releases the pallet, allowing the escapement-shaft to move one step and returning the armature 134 again into contact with the poles of such magnet. The turning of the escapement-shaft at the very start of the movement allows the secondary circuit-closer to drop off of one of the teeth of the cam 144, closing the branch circuit through the contacts 146 and escapement-magnet. By this time, however, the armature 134 is sufficiently removed from the escapement-magnet as to be uninfluenced thereby; but by the time the escapement-teeth have returned the pallet to its former position the escapement-magnet will have been built up to again lock the armature and prevent rotation of the distributer-shaft. The feed movement of the distributer-shaft also turns the resetting-cam 164 to restore the armature positively, again closing the circuit through the escapement-magnet to the contact-pieces 117. This movement of the distributer-shaft moves the brush 157 from the plate on which it formerly rested to the next succeeding plate. The local circuit, including the distributer-plates, is, however, still broken, so that the selector-magnet, which is connected to the plate on which the brush had rested, will not be affected. If the next impulse is of the opposite—say negative—polarity, the coils 106 will be influenced, allowing the armature 110 to drop. This breaks the local circuit through the escapement-magnet at the other contact 117 and another feed takes place. It also closes the local circuit at the contact 118, and the second selector-magnet will be thus energized. In this way it will be observed that impulses of one polarity will advance the distributer-shaft one step without affecting any selector-magnet, while impulses of the other polarity not only advance the distributer-shaft one step, but also affect the particular selector-magnet with which the brush 157 may at the time be in circuit. In this way we are enabled to actuate the selector-magnets of two selectors with the desired permutations corresponding to the line impulses. During the time the brush 157 is in contact with the first five distributer-plates the printing-cam 147 for the other selector will have closed the printing-circuit therefor, which circuit will then be broken, followed by the closure of the restoration-circuit by the cam 149 of the same selector, putting that selector in condition to receive new local impulses or setting it in accordance with the next character or letter. During the time the brush 157 is in contact with the second set of five distributer-plates to place the second selector in the desired condition the printing-cam 148 and restoration-cam 150 for the first selector will operate to effect the printing therethrough and its restoration. During the operation of the escapement-shaft it will be observed that the tooth 140 of the corrector 139 will be successively unsupported by the portions of the cam 137 between the teeth. Under normal operation the inertia of the corrector is such that between the successive feed movements of the distributer-shaft the corrector is not allowed to descend sufficiently to break the circuit through the escapement-magnet at the contacts 143. If, however, only a single impulse is sent over the line to advance the distributer-shaft one step, the corrector 139 will be allowed to drop, breaking the primary local circuit through the escapement-magnet and allowing the release of the pallet, whereby the destributer-shaft will advance another step. When the shaft comes to rest, the corrector will once more operate to break the circuit to the escapement-magnet, and this operation continues until the distributer-shaft is turned to one or the other of its normal positions, bringing one of the wide teeth 138 under the pointed tooth of the corrector and maintaining the primary local circuit through the escapement-magnet closed. While we prefer to make the corrector of sufficient mass as not to become operative at the ordinary speed of rotation of the distributer-shaft, as explained, it will be understood that the corrector could operate to break the primary local circuit through the escape-magnet at each feed movement, provided, of course, its operation was not in advance of the normal speed of the line.

Having now described our invention, what we claim as new, and desire to secure by Letters Patent, is as follows:

1. A relay comprising a permanent magnet, two neutralizing-coils, the downturned pole-pieces and the armature normally maintained almost in contact with the pole-pieces and movable toward the coils, substantially as set forth.

2. A relay comprising a permanent magnet, two neutralizing-coils, the downturned pole-pieces, the armature normally maintained almost in contact with the pole-pieces and movable toward the coils, and means for adjusting said pole-pieces with respect to the armature, substantially as set forth.

3. A relay comprising a permanent magnet, two neutralizing-coils, the downturned pole-pieces, the armature normally maintained almost in contact with the pole-pieces and movable toward the coils, the pole-pieces being pivoted to the coils, and means for adjusting the pivoted pole-pieces with respect to the armature, substantially as set forth.

4. A relay comprising a permanent magnet, a neutralizing-coil therefor, an armature normally maintained almost in contact with the pole-pieces of the magnet, and an intermittently-operating cam controlled by the relay for positively restoring the armature, substantially as set forth.

5. In a relay-distributer, the combination with a distributer-shaft, of an escapement-magnet for controlling an intermittent feed of said shaft, two relays the armatures of which control the escapement-magnet, and means controlled by the shaft for restoring the relay-armatures, substantially as described.

6. In a relay-distributer, the combination with a distributer-shaft, of an escapement-magnet for controlling an intermittent feed of said shaft, two relays the armatures of which control the escapement-magnet, and a cam carried by the shaft for restoring the relay-armatures, substantially as set forth.

7. In a relay-distributer, the combination with a distributer-shaft, of an escapement-magnet for controlling an intermittent feed of said shaft, two relays the armatures of which control the escapement-magnet, a cam carried by the shaft for restoring the relay-armatures, and an oil-receptacle in which said cam is immersed, substantially as set forth.

8. In a relay-distributer, the combination of the distributer-shaft, an escapement device for allowing an intermittent feed thereof, a magnet controlling the escapement device, said magnet being included in a normally-closed circuit, and two relay-magnets the armatures of which normally close said circuit but adapted to break the circuit to release the escapement device when either one of said relay-magnets is neutralized, substantially as set forth.

9. In a relay-distributer, the combination of the distributer-shaft, an escapement device for allowing an intermittent feed thereof, a magnet controlling the escapement device, said magnet being included in a normally-closed circuit, two relay-magnets the armatures of which normally close said circuit but adapted to break the circuit to release the escapement mechanism when either one of said relay-magnets is neutralized, and a secondary circuit-closer adapted to close the circuit through the escapement-magnet immediately after the latter is deënergized, substantially as set forth.

10. In a relay-distributer, the combination of the distributer-shaft, an escapement device for allowing an intermittent feed thereof, a magnet controlling the escapement device, said magnet being included in a normally-closed circuit, two relay-magnets the armatures of which normally close said circuit but adapted to break the circuit to release the escapement mechanism when either one of said relay-magnets is neutralized, a secondary circuit-closer adapted to close the circuit through the escapement-magnet immediately after the latter is deënergized, and a cam on the distributer-shaft for operating the secondary circuit-closer, substantially as set forth.

11. In a distributer, the combination with a distributer-shaft, of an escapement mechanism, an escapement-magnet controlling the escapement mechanism, a notched cam on the distributer-shaft, and a corrector consisting of a circuit-breaker coöperating with said cam and in circuit with the escapement-magnet, substantially as set forth.

12. In a distributer, the combination with a distributer-shaft, of an escapement mechanism, an escapement-magnet controlling the escapement mechanism, a notched cam on the distributer-shaft, a corrector coöperating with said cam and in circuit with the escapement-magnet, and a wide tooth on the corrector-cam for preventing the operation of the corrector when the distributer-shaft reaches its normal position, substantially as set forth.

13. In a distributer, the combination with a distributer-shaft, an escapement mechanism, a magnet controlling the escapement mechanism, a printing-cam on the distributer-shaft, a circuit-operating device controlled by said cam, a restoring-cam on said shaft, and a circuit-operating device controlled by the restoring-cam after the operation of the printing-cam, substantially as set forth.

14. The combination with two sets of selector-magnets, of a distributer comprising a distributer-shaft carrying a contact device, a series of plates corresponding to the selector-magnets, with which the contact device coöperates, an escapement device for the distributer-shaft, a magnet controlling said escapement device, two printing-cams on the distributer-shaft controlling the printing-circuits to the two selectors, and two restoring-cams on the distributer controlling the restoring-circuits of the two selectors, substantially as set forth.

This specification signed and witnessed this 7th day of February, 1899.

KIRK HIMROD.
  JOHN R. TUCKER.
  CHARLES C. HINCKLEY.

Witnesses:
 W. J. TYERS,
 J. W. TUCKER.